US009639218B2

(12) United States Patent
Lu et al.

(10) Patent No.: US 9,639,218 B2
(45) Date of Patent: May 2, 2017

(54) LIQUID CRYSTAL PANEL, DISPLAY DEVICE AND SCANNING METHOD THEREOF

(71) Applicants: Shanghai Tianma Micro-Electronics Co., Ltd., Shanghai (CN); Tianma Micro-Electronics Co., Ltd., Shenzhen (CN)

(72) Inventors: Feng Lu, Shanghai (CN); Jun Ma, Shanghai (CN); Qijun Yao, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 336 days.

(21) Appl. No.: 14/245,933

(22) Filed: Apr. 4, 2014

(65) Prior Publication Data
US 2015/0042604 A1 Feb. 12, 2015

(30) Foreign Application Priority Data

Aug. 7, 2013 (CN) .......................... 2013 1 0342692

(51) Int. Cl.
G06F 3/044 (2006.01)
G06F 3/041 (2006.01)
G06F 3/046 (2006.01)

(52) U.S. Cl.
CPC .............. *G06F 3/044* (2013.01); *G06F 3/046* (2013.01); *G06F 3/0412* (2013.01)

(58) Field of Classification Search
CPC ...................................... G06F 3/044
See application file for complete search history.

(56) References Cited

U.S. PATENT DOCUMENTS

2011/0141042 A1* 6/2011 Kim ................... G02F 1/13338
345/173
2012/0169400 A1* 7/2012 Liu ....................... G06F 3/0416
327/517

FOREIGN PATENT DOCUMENTS

CN 200910087390 A 12/2010
CN 201010214898 A 1/2011
(Continued)

OTHER PUBLICATIONS

Office Action as issued in corresponding Chinese Application No. 201310342692.3, dated Jan. 5, 2016.

*Primary Examiner* — Michael Faragalla
*Assistant Examiner* — Chayce Bibbee
(74) *Attorney, Agent, or Firm* — Alston & Bird LLP

(57) ABSTRACT

A liquid crystal panel, a display device and a scanning method thereof is disclosed. The liquid crystal panel includes a CF substrate, a TFT substrate and a liquid crystal layer sandwiched between the CF substrate and the TFT substrate; the CF substrate includes a transparent substrate and an integrated capacitive-electromagnetic composite touch layer located at the inner side of the transparent substrate to identify touch signals; wherein, the integrated capacitive-electromagnetic composite touch layer includes a capacitive touch structure and an electromagnetic touch structure electrically insulated from each other. According to the embodiments of the present invention, the integrated capacitive-electromagnetic composite touch layer is integrated to the inner of the CF substrate, so that the liquid crystal display including the liquid crystal panel of the embodiments of the present invention has capacitive and electromagnetic touch functions and is relatively thin.

10 Claims, 6 Drawing Sheets

(56) References Cited

FOREIGN PATENT DOCUMENTS

| CN | 201120099642 U | 11/2011 |
|---|---|---|
| CN | 201120396725 U | 11/2012 |
| CN | 103092446 A | 5/2013 |

\* cited by examiner

LIQUID CRYSTAL PANEL, DISPLAY DEVICE AND SCANNING METHOD THEREOF

CROSS-REFERENCES TO RELATED APPLICATIONS

This application claims the benefit of priority to Chinese Patent Application No. 201310342692.3, filed with the Chinese Patent Office on Aug. 7, 2013 and entitled "LIQUID CRYSTAL PANEL, DISPLAY DEVICE AND SCANNING METHOD THEREOF", the content of which is incorporated herein by reference in its entirety.

TECHNICAL FIELD

The present invention relates to the field of electronic technology, and in particular to a liquid crystal panel, a display device and a scanning method thereof.

BACKGROUND OF THE INVENTION

A touch screen is an input equipment enabling a user to directly input a command of the user by selecting command contents displayed on a screen of an image display and the like by hand or with an object, and when the user is in direct contact with the touch screen by hand or with the object, the touch screen detects a touch point and drives a liquid crystal display according to the command of a selected icon to realize specific displaying.

The existing touch screens are mainly divided into capacitive touch screens and electromagnetic touch screens according to different working principles; wherein, the capacitive touch screens identify touch position through received touch signals (namely, electrical signals), while the electromagnetic touch screens identify touch position through received touch signals (namely, electromagnetic signals from electromagnetic needles). At present, an independent capacitive touch screen is generally assembled on the outer side (namely, one side facing a viewer) of a liquid crystal display, so as to receive the electrical signals corresponding to the touch operations; and an independent electromagnetic touch screen is assembled on the outer side of the liquid crystal display or in the back of a backlight module.

However, the present independent capacitive touch screen and independent electromagnetic touch screen are externally mounted on the liquid crystal display, so that the liquid crystal display with capacitive and electromagnetic touch functions is relatively thick.

BRIEF SUMMARY OF THE INVENTION

In embodiments of the present invention, a liquid crystal panel, a display device and a scanning method thereof are provided.

An embodiment of the present invention provides a liquid crystal panel, including a CF (color filter) substrate, a TFT (Thin Film Transistor) substrate and a liquid crystal layer sandwiched between the CF substrate and the TFT substrate; the CF substrate includes a transparent substrate and an integrated capacitive-electromagnetic composite touch layer located at the inner side of the transparent substrate and the integrated capacitive-electromagnetic composite touch layer is configured to identify touch signals; wherein, the integrated capacitive-electromagnetic composite touch layer includes a capacitive touch structure and an electromagnetic touch structure electrically insulated each other.

Another embodiment of the present invention provides a display device, including forementioned liquid crystal panel.

Another embodiment of the present invention provides a scanning method for a display device, which is suitable to be applied to the display device including a capacitive touch structure and an electromagnetic touch structure, and the method includes: performing display scanning, and capacitive touch scanning or electromagnetic touch scanning in a time sharing manner in one frame; or simultaneously performing electromagnetic touch scanning and display scanning in one frame.

DETAILED DESCRIPTION OF THE PREFERRED EMBODIMENTS

In an embodiment of the present invention, a liquid crystal panel includes a CF substrate, a TFT substrate and a liquid crystal layer between the CF substrate and the TFT substrate, and the CF substrate includes a transparent substrate and a integrated capacitive-electromagnetic composite touch layer located at the inner side of the transparent substrate and the integrated capacitive-electromagnetic composite touch layer is configured to identify touch signals; wherein, the integrated capacitive-electromagnetic composite touch layer includes a capacitive touch structure and an electromagnetic touch structure electrically insulated each other, and the integrated capacitive-electromagnetic composite touch layer including the capacitive touch structure and the electromagnetic touch structure is integrated to the inner of the CF substrate, so that the liquid crystal display device including the liquid crystal panel of the embodiment of the present invention has capacitive and electromagnetic touch functions, and is thinned and its power consumption is reduced.

The embodiments of the present invention are further described in detail below in conjunction with the accompanying drawings of the specification.

Figure 1:
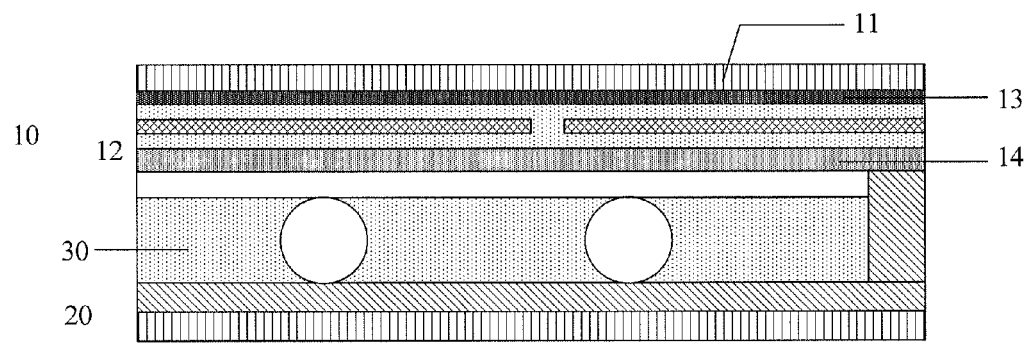
FIG. 1 to FIG. 5 are schematic structural diagrams of a liquid crystal panel in an embodiment of the present invention.

As shown in FIG. 1, a liquid crystal panel provided in an embodiment of the present invention includes a CF substrate 10, a TFT substrate 20 and a liquid crystal layer 30 between the CF substrate 10 and the TFT substrate 20. The CF substrate 10 includes a transparent substrate 11 and a integrated capacitive-electromagnetic composite touch layer 12 located at the inner side of the transparent substrate 11 and the integrated capacitive-electromagnetic composite touch layer 12 is configured to identify touch signals, wherein, the integrated capacitive-electromagnetic composite touch layer 12 includes a capacitive touch structure and an electromagnetic touch structure electrically insulated each other, so that the integrated capacitive-electromagnetic composite touch layer 12 can identify touch signals input by a human body and an electromagnetic needle.

The integrated capacitive-electromagnetic composite touch layer is located in the inner of the CF substrate (namely, the integrated capacitive-electromagnetic composite touch layer is embedded into the liquid crystal panel), so that the liquid crystal panel of the embodiment of the present invention has capacitive and electromagnetic touch functions, thus a display device including the liquid crystal panel of the embodiment of the present invention has the capacitive and electromagnetic touch functions; and compared with the display device with the capacitive and electromagnetic touch functions in the prior art, the display device including the liquid crystal panel of the embodiment of the present invention is thinned and its power consumption is reduced.

Preferably, the CF substrate of the embodiment of the present invention further includes a BM (black matrix) layer, a color filter layer (namely, a color blocking layer) and a flattened layer stacked successively at the inner side of the transparent substrate.

The integrated capacitive-electromagnetic composite touch layer may be located between any two adjacent layers of the BM layer, the color filter layer and the flattened layer, or between the BM layer and the flattened layer, or between the flattened layer and the liquid crystal layer.

For example, as shown in FIG. 1, the integrated capacitive-electromagnetic composite touch layer 12 is located between the BM layer 13 and the color filter layer 14.

Figure 2:
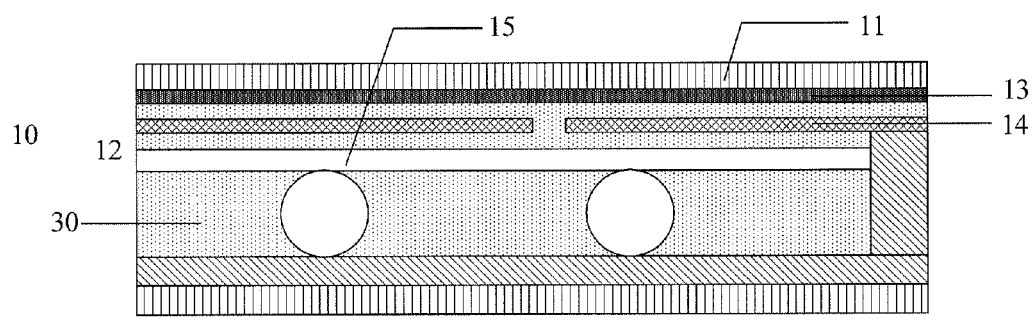

As shown in FIG. 2, the integrated capacitive-electromagnetic composite touch layer 12 is located between the BM layer 13 and the flattened layer 15, and preferably in FIG. 2, the color filter layer 14 plays a role in insulating the capacitive touch structure and the electromagnetic touch structure in the integrated capacitive-electromagnetic composite touch layer 12. Of course, the color filter layer 14 serving as an insulating layer itself in the integrated capacitive-electromagnetic composite touch layer 12 is only one preferable mode, the color filter layer 14 may also not be designed in such manner, and the color filter layer 14 may be merely arranged between the BM layer 13 and the flattened layer 15 as described previously, that is the color filter layer 14 may be located on any side of the integrated capacitive-electromagnetic composite touch layer 12.

The implementations of the position of the integrated capacitive-electromagnetic composite touch layer in the embodiment of the present invention are specifically introduced above in conjunction with FIG. 1 and FIG. 2 respectively. In the specific implementation, the integrated capacitive-electromagnetic composite touch layer may also be located between the color filter layer and the flattened layer or between the flattened layer and the liquid crystal layer, and the corresponding implementations are similar to those illustrated in FIG. 1 and FIG. 2 of the embodiments of the present invention and are not described redundantly herein.

The position of the integrated capacitive-electromagnetic composite touch layer of this embodiment can be relatively flexible. Preferably, any one of the CF substrate or the TFT substrate may also include a common electrode layer. When the common electrode layer is located at the inner side of the TFT substrate, a number of layers included in the CF substrate of the embodiment of the present invention is increased or reduced and the increased layers do not include the common electrode layer, the position of the integrated capacitive-electromagnetic composite touch layer in the embodiment of the present invention may also be correspondingly changed, wherein the position of the integrated capacitive-electromagnetic composite touch layer may be one of the following positions:

1, between any two adjacent layers in multiple layers at the inner side of the transparent substrate of the CF substrate;

2, between two side layers of any three adjacent layers in multiple layers at the inner side of the transparent substrate of the CF substrate, and the integrated capacitive-electromagnetic composite touch layer includes a middle layer of the any three adjacent layers (for example, as shown in FIG. 2, the any three adjacent layers are the BM layer 13, the color filter layer 14 and the flattened layer 15, the integrated capacitive-electromagnetic composite touch layer is located between the BM layer 13 and the flattened layer 15, so the two side layers of the any three adjacent layers are the BM layer 13 and the flattened layer 15, and the middle layer of the any three adjacent layers is the color filter layer 14);

3, between a layer closest to the liquid crystal layer in multiple layers at the inner side of the transparent substrate of the CF substrate and the liquid crystal layer (for example, as shown in FIG. 2, the flattened layer 15 is the layer closest to the liquid crystal layer 30 in the multiple layers at the inner side of the transparent substrate 11 of the CF substrate 10, then the integrated capacitive-electromagnetic composite touch layer 12 may be located between the flattened layer 15 and the liquid crystal layer 30).

Figure 3:
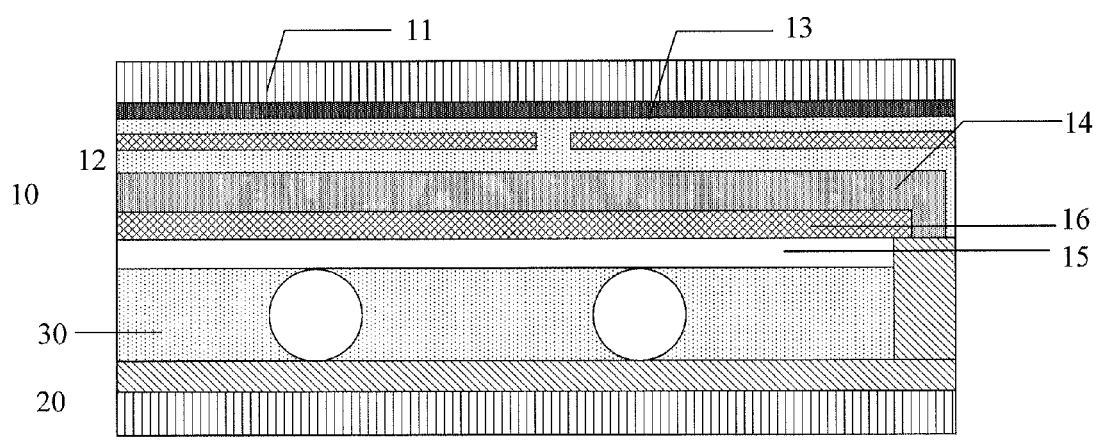

Preferably, when the common electrode layer is located at the inner side of the CF substrate, a number of the layers included in the CF substrate of the embodiment of the present invention is increased and the increased layers include the common electrode layer, the position of the integrated capacitive-electromagnetic composite touch layer in the embodiment of the present invention may also be correspondingly changed, wherein, the position of the integrated capacitive-electromagnetic composite touch layer may be one of the following positions (wherein, "selected layers" are defined as layers between the transparent substrate of the CF substrate and the common electrode layer, and the selected layers adjacent to the common electrode layer must be the ones capable of electrically insulating the integrated capacitive-electromagnetic composite touch layer and the common electrode layer):

1, between any two adjacent selected layers in multiple selected layers at the inner side of the transparent substrate of the CF substrate;

for example, as shown in FIG. 3, a liquid crystal panel provided in an embodiment of the present invention includes a CF substrate 10, a TFT substrate 20 and a liquid crystal layer 30 sandwiched between the CF substrate 10 and the TFT substrate 20; the CF substrate 10 includes a transparent substrate 11, and a BM layer 13, a color filter layer 14, a common electrode layer 16 and a flattened layer 15 stacked successively at the inner side of the transparent substrate 11;

the common electrode layer 16 is located between the color filter layer 14 and the flattened layer 15, and the selected layers are the BM layer 13 and the color filter layer 14 which are between the transparent substrate 11 of the CF substrate 10 and the common electrode layer 16;

thus, the integrated capacitive-electromagnetic composite touch layer may be located between the BM layer 13 and the color filter layer 14, and the color filter layer 14 enables the integrated capacitive-electromagnetic composite touch layer 12 and the common electrode layer 16 to be electrically insulated.

Figure 4:
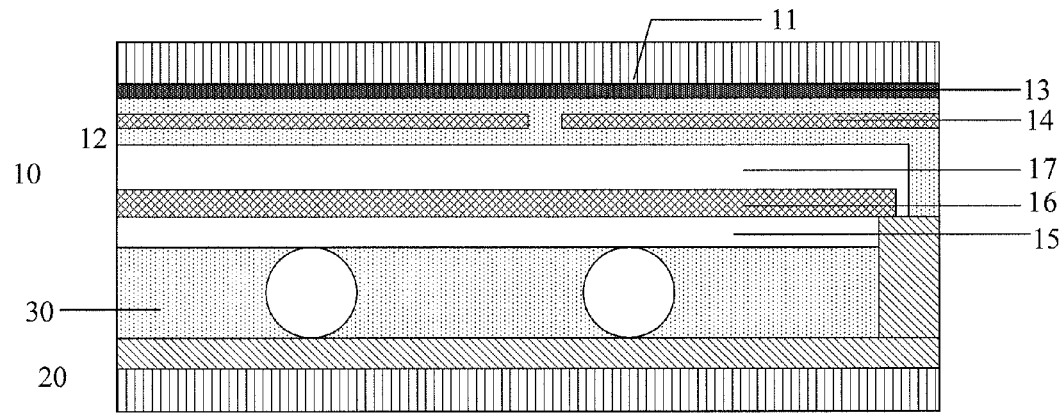

2, between two side layers of any three adjacent layers in multiple selected layers at the inner side of the transparent substrate of the CF substrate, and the integrated capacitive-electromagnetic composite touch layer includes a middle layer of the any three adjacent layers; for example, as shown in FIG. 4, a liquid crystal panel provided in an embodiment of the present invention includes a CF substrate 10, a TFT substrate 20 and a liquid crystal layer 30 sandwiched between the CF substrate 10 and the TFT substrate 20; the CF substrate 10 includes a transparent substrate 11, and a BM layer 13, a color filter layer 14, a transparent insulating layer 17, a common electrode layer 16 and a flattened layer 15 stacked successively at the inner side of the transparent substrate 11;

the common electrode layer 16 is located between the transparent insulating layer 17 and the flattened layer 15, and the selected layers are the BM layer 13, the color filter layer 14 and the transparent insulating layer 17 which are between the transparent substrate 11 of the CF substrate 10 and the common electrode layer 16, and the transparent insulating layer 17 enables the integrated capacitive-electromagnetic composite touch layer 12 and the common electrode layer 16 to be electrically insulated;

herein, the any three adjacent layers are the BM layer 13, the color filter layer 14 and the transparent insulating layer 17, the two side layers of the any three filter layers are the BM layer 13 and the transparent insulating layer 17, the integrated capacitive-electromagnetic composite touch layer is located between the two side layers of the any three adjacent layers, namely between the BM layer 13 and the transparent insulating layer 17, and the integrated capacitive-electromagnetic composite touch layer 12 includes a middle layer (namely, the color filter layer 14) of the any three adjacent layers.

In the specific implementation, particularly, when the integrated capacitive-electromagnetic composite touch layer is located between the BM layer and the color filter layer or between the BM layer and the flattened layer, the capacitive touch structure and the electromagnetic touch structure included in the integrated capacitive-electromagnetic composite touch layer may be made of metal material. In the implementation, when the capacitive touch structure and the electromagnetic touch structure included in the integrated capacitive-electromagnetic composite touch layer is made of the metal material, the resistance of the integrated capacitive-electromagnetic composite touch layer can be relatively low.

Any touch structure integrated with the capacitive touch structure and the electromagnetic touch structure below is applicable to the embodiments of the present invention. (namely, in the embodiments of the present invention, the touch structure formed by integrating the capacitive touch structure and the electromagnetic touch structure is the integrated capacitive-electromagnetic composite touch layer)

Preferably, the capacitive touch structure includes a pattern of the capacitive touch structure and at least one capacitive bridge (i.e. capacitive touch structure bridge), and the electromagnetic touch structure includes a pattern of the electromagnetic touch structure and at least one electromagnetic bridge (i.e. electromagnetic touch structure bridge), wherein the pattern of the capacitive touch structure and the pattern of the electromagnetic touch structure may be located on a same layer in the integrated capacitive-electromagnetic composite touch layer or on different layers in the integrated capacitive-electromagnetic composite touch layer, which will be introduced respectively below.

Mode I

The pattern of the capacitive touch structure and the pattern of the electromagnetic touch structure are located on different layers in the integrated capacitive-electromagnetic composite touch layer.

Figure 5:
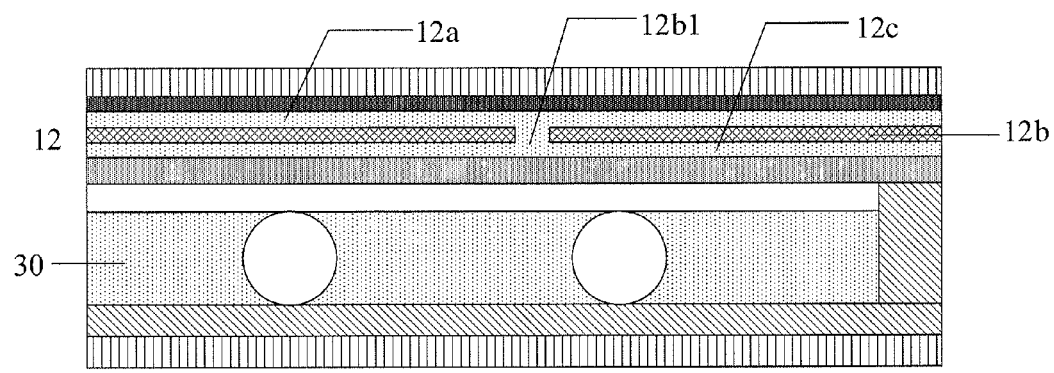

Preferably, as shown in FIG. 5, the integrated capacitive-electromagnetic composite touch layer 12 includes a first conductive layer 12a, an insulating layer 12b and a second conductive layer 12c;

the first conductive layer 12a includes at least one electromagnetic bridge, and a plurality of driving electrode lines arranged in parallel in a first direction and a plurality of sensing electrode lines arranged in parallel in a second direction for forming the capacitive touch structure, wherein each driving electrode line includes a plurality of driving electrode blocks connected successively and electrically, each sensing electrode line includes a plurality of sensing electrode blocks connected successively and electrically, the driving electrode lines and the sensing electrode lines are mutually crossed and electrically insulated, and the driving electrode lines and the sensing electrode lines are electrically insulated from the at least one electromagnetic bridge;

the insulating layer 12b includes at least one via hole 12b1 electrically conducting the first conductive layer 12a and the second conductive layer 12c;

the second conductive layer 12c includes at least one capacitive bridge and a plurality of conductive coils crossed and electrically insulated each other and configured to form an electromagnetic touch structure, wherein the conductive coils are electrically insulated from the at least one capacitive bridge;

wherein, the driving electrode blocks may be directly electrically connected along the first direction to form the driving electrode lines, and the sensing electrode blocks may be electrically connected along the second direction by the at least one via hole and the at least one capacitive bridge to form the sensing electrode lines;

or, the driving electrode blocks are electrically connected along the first direction by the at least one via hole and the at least one capacitive bridge to form the driving electrode lines, and the sensing electrode blocks are directly electrically connected along the second direction to form the sensing electrode lines;

or, the driving electrode blocks are electrically connected along the first direction by the at least one via hole and the at least one capacitive bridge to form the driving electrode lines, and the sensing electrode blocks are electrically connected along the second direction by the at least one via hole and the at least one capacitive bridge to form the sensing electrode lines;

and the conductive coils crossed and electrically insulated each other are electrically connected by the at least one via hole and the at least one electromagnetic bridge.

Herein, the pattern of the capacitive touch structure, namely pattern of the driving electrode blocks and pattern of the sensing electrode blocks, is located on the first conductive layer 12a; and the pattern of the electromagnetic touch structure, namely the conductive coils, is located on the second conductive layer 12c.

Those skilled in the art should understand that the at least one conductive bridge is a conductive structure (which can also be regarded as a wire) for electrically connecting the plurality of driving electrode blocks or the plurality of sensing electrode blocks, and the at least one electromagnetic bridge is a conductive structure (e.g. wire) for electrically connecting the conductive coils, wherein, a plurality of driving electrode blocks or sensing electrode blocks are electrically connected with the at least one capacitive bridge to form a plurality of driving electrode lines arranged in parallel along the first direction or a plurality of sensing electrode lines arranged in parallel along the second direction, and the conductive coils crossed and electrically insulated each other are electrically connected by the at least one electromagnetic bridge.

Figure 6:
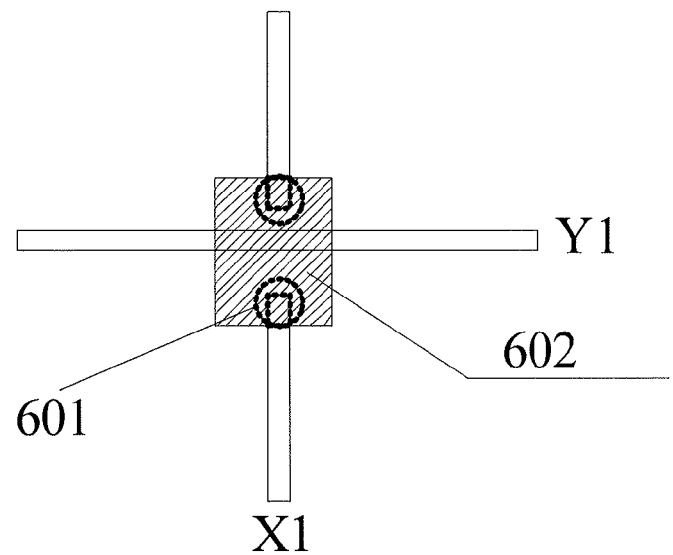
FIG. 6 is a schematic diagram of electrical connection between conductive coils crossed and electrically insulated each other in an embodiment of the present invention.

FIG. 6 shows an electrical connection of the conductive coils crossed and electrically insulated each other by an electromagnetic bridge. As shown in FIG. 6, a conductive coil X1 and a conductive coil Y1 crossed each other need to be electrically connected. In order to maintain electrical insulation between the conductive coil X1 and the conductive coil Y1, the conductive coil X1 and the conductive coil Y1 are electrically connected by a via hole 601 and an electromagnetic bridge 602.

In the specific implementation, the pattern of the capacitive touch structure located on the first conductive layer, namely, the arrangement of patterns of the driving electrode lines and the sensing electrode lines included in the capacitive touch structure may be multiple, and one of the arrangement is introduced below.

Figure 7A:
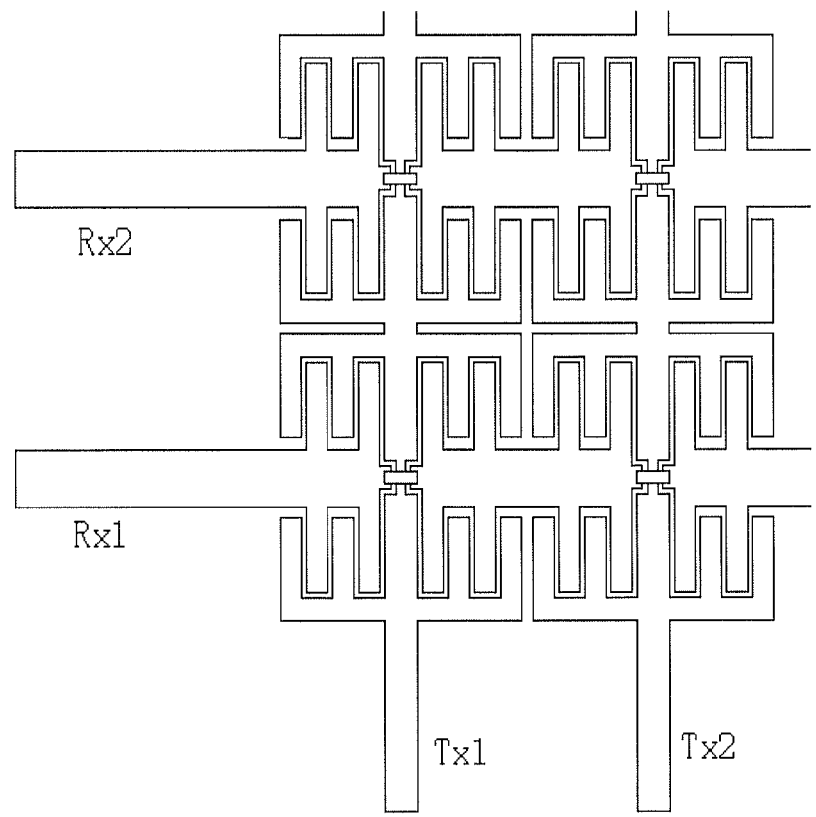
FIG. 7A is a schematic diagram of a pattern of a capacitive touch structure in an embodiment of the present invention.

Preferably, as shown in FIG. 7A, the pattern of the capacitive touch structure includes driving electrode lines Tx (only Tx1 and Tx2 are shown in FIG. 7A) arranged in parallel along the first direction (taking vertical direction as an example in the FIG. 7A) and sensing electrode lines Rx (only Rx1 and Rx2 are shown in FIG. 7A) arranged in parallel along the second direction (taking horizontal direction as an example in the FIG. 7A), the driving electrode blocks and the sensing electrode blocks are in irregular shapes (in other cases, the driving electrode blocks and the sensing electrode blocks may also be in regular shapes, such as rhombus, oblong or square). The driving electrode blocks are directly electrically connected along the vertical direction to form the driving electrode lines, and the sensing electrode blocks are electrically connected along the horizontal direction by the at least one via hole and the at least one capacitive bridge to form the sensing electrode lines.

For the case that the sensing electrode blocks are directly electrically connected along the horizontal direction and the driving electrode blocks are electrically connected along the vertical direction by the at least one via hole and the at least one capacitive bridge and for the case that both the driving electrode blocks and the sensing electrode blocks are electrically connected by the at least one via hole and the at least one capacitive bridge, reference can be made to the above implementation, which is not described redundantly herein.

In the specific implementation, one end of each driving electrode line and each sensing electrode line is electrically connected with a capacitive touch IC (integrated circuit), so that when a display device performs capacitive touch scanning, the capacitive touch IC may preferably successively transmit an alternating current signal to each driving electrode line (when one driving electrode line works, the other driving electrode lines can be grounded) and control all the sensing electrode lines to read or detect corresponding alternating current signal.

The working principle of the capacitive touch structure is as follows: when a human body touches a touch screen, the human body and the touch screen form a circuit, so that a capacitance between the driving electrode lines and the sensing electrode lines is changed, the magnitude of the signal on the sensing electrode line corresponding to the touch position of the human body is changed, thus a touch can be judged out; and when in an XY-axis coordinate, an X-directional coordinate corresponding to the touch position may be determined through successive scanning by the driving electrode lines by time sharing, and a Y-directional coordinate corresponding to the touch position may be determined through detecting the changed magnitude of the signal on the sensing electrode line, so that the coordinates of the touch position are determined and a touch point is found.

Preferably, the insulating layer 12*b* in mode I of the embodiment of the present invention is a transparent organic film.

In the specific implementation, the pattern of the electromagnetic touch structure located on the second conductive layer, namely, the arrangement of the conductive coils included in the electromagnetic touch structure may be multiple, and one of the arrangements is introduced below.

Figure 8A:
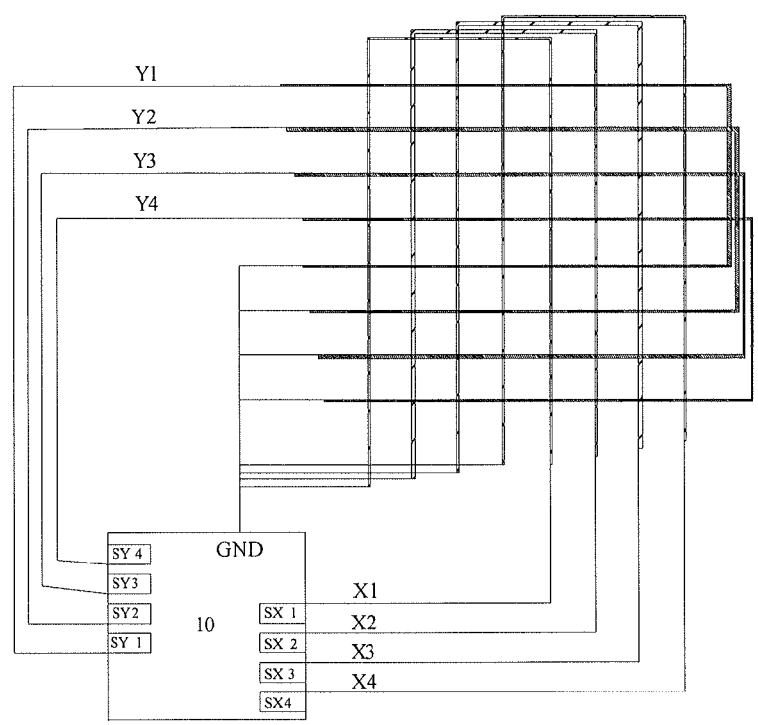
FIG. 8A is a schematic diagram of a pattern of an electromagnetic touch structure in an embodiment of the present invention.

Preferably, as shown in FIG. 8A, the pattern of the electromagnetic touch structure includes conductive coils X and conductive coils Y (only coil X1 to coil X4 and coil Y1 to coil Y4 are shown in FIG. 8A) mutually crossed, wherein four conductive coils (coil X1 to coil X4) are arranged along the "Y-X-Y" direction, and four conductive coils (coil Y1 to coil Y4) are arranged along the "X-Y-X" direction so as to realize cross connection of the conductive coils, and there are four crossing points between the coil Xi (i=1, 2, 3 or 4) and the coil Yi (i=1, 2, 3 or 4); one end of the conductive coil Xi (i=1, 2, 3 or 4) is connected with an emission/detection switch SXi (i=1, 2, 3 or 4) of an electromagnetic touch IC 10, one end of the conductive coil Yi (i=1, 2, 3 or 4) is connected with an emission/detection switch SYi (i=1, 2, 3 or 4) of the electromagnetic touch IC 10, and the other end of each conductive coil, namely Xi (i=1, 2, 3 or 4) or Yi (i=1, 2, 3 or 4), is connected with the GND (ground). The pattern of each conductive coil is a closed pattern similarly of "rectangular" shape, so that when a display device performs electromagnetic touch scanning, the electromagnetic touch IC successively transmits an alternating current signal to each conductive coil, namely Xi (i=1, 2, 3 or 4) or Yi (i=1, 2, 3 or 4).

In the specific implementation, for the closed conductive coils with shape similar to "rectangular", included in the electromagnetic touch structure, when a alternating current signals are transmitted to the conductive coils, an alternating magnetic field is generated. Because the alternating magnetic field is generated in the inner of an area encircled by the closed conductive coils, the inner area encircled by the closed conductive coils must be a blank space.

Figure 9:
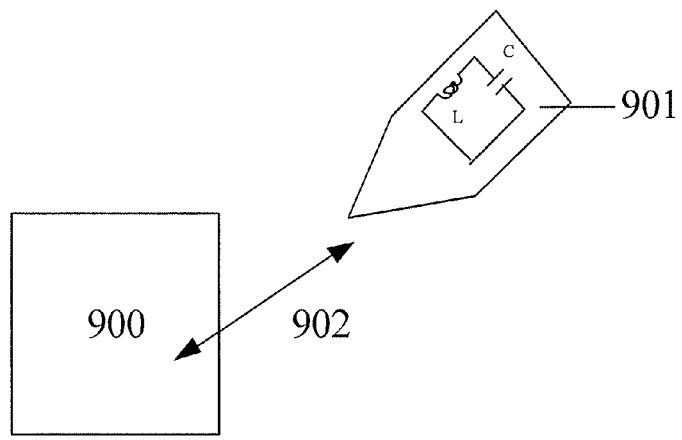
FIG. 9 is a schematic diagram showing a working principle of the electromagnetic touch structure in an embodiment of the present invention.

Referring to FIG. 9, the working principle of an electromagnetic touch structure 900 is as follows: when the electromagnetic touch IC successively transmits a alternating current signal to each conductive coil, since the conductive coils form a "rectangular" circular similar to an inductance, an induced alternating magnetic field 902 with a specific frequency is generated; an inductance L in an electromagnetic needle 901 including an oscillating circuit (wherein, the oscillating circuit includes a capacitance C and the inductance L connected in series) can induce the alternating magnetic field 902, thus oscillating current is generated in the electromagnetic needle 901, and meanwhile the oscillating current is converted to the alternating magnetic field 902 with a similar frequency for subsequent emission; as shown in FIG. 9, the conductive coils can generate induced current directed to the alternating magnetic field 902, so the position of the electromagnetic needle 901 can be judged by detecting the presence of the induced current and the magnitude of the induced current; and some information (such as handwriting pressure) from the electromagnetic needle 901 can be judged by detecting the change of frequency of the induced current.

In the specific implementation, a capacitive touch IC and an electromagnetic touch IC may be located on a flexible printed circuit board included in the TFT substrate, the pattern of the capacitive touch structure and the pattern of the electromagnetic touch structure included in the integrated capacitive-electromagnetic composite touch layer at the inner side of the CF substrate are connected with a conductive pad, and there is a conductive pad connected to a control terminal on the TFT substrate at a corresponding position, and the conductive pad on one side of the CF substrate is connected with the conductive pad on one side of the TFT substrate through a gold ball in a frame glue, so as to achieve connection between the capacitive touch IC and the pattern of the capacitive touch structure and connection between the electromagnetic touch IC and the pattern of the electromagnetic touch structure; and electrical signals generated by the capacitive touch IC and/or the electromagnetic touch IC are transmitted to the CF substrate from the TFT substrate and drive the integrated capacitive-electromagnetic composite touch layer to work.

Preferably, as shown in FIG. 5, among the first conductive layer 12a, the insulating layer 12b and the second conductive layer 12c, the second conductive layer 12c is closest to the liquid crystal layer 30 (namely, the pattern of the electromagnetic touch structure is closest to the liquid crystal layer 30).

When the electromagnetic touch structure is closest to the liquid crystal layer, the influence of noise signals generated by the liquid crystal display device on the capacitive touch structure may be avoided or reduced to a certain extent.

Mode II

The pattern of the capacitive touch structure and the pattern of the electromagnetic touch structure are located on a same layer in the integrated capacitive-electromagnetic composite touch layer.

Preferably, as shown in FIG. 5, the integrated capacitive-electromagnetic composite touch layer 12 includes a first conductive layer 12a, an insulating layer 12b and a second conductive layer 12c; the first conductive layer 12a includes a plurality of driving electrode lines arranged in parallel in a first direction and a plurality of sensing electrode lines arranged in parallel in a second direction for forming the capacitive touch structure, and a plurality of conductive coils crossed and electrically insulated each other for forming the electromagnetic touch structure, wherein each driving electrode line includes a plurality of driving electrode blocks connected successively and electrically, each sensing electrode line includes a plurality of sensing electrode blocks connected successively and electrically, the driving electrode lines and the sensing electrode lines are crossed and electrically insulated each other, and the driving electrode lines, the sensing electrode lines and the conductive coils are electrically insulated from each other; the insulating layer 12b includes at least one via hole 12b1 conducting the first conductive layer 12a and the second conductive layer 12c; the second conductive layer 12c includes at least one capacitive bridge and at least one electromagnetic bridge which are electrically insulated from each other; wherein, the driving electrode blocks are directly electrically connected along the first direction to form the driving electrode lines, and the sensing electrode blocks are electrically connected along the second direction by the at least one via hole and the at least one capacitive bridge to form the sensing electrode lines; or, the driving electrode blocks are electrically connected along the first direction by the at least one via hole and the at least one capacitive bridge to form the driving electrode lines, and the sensing electrode blocks are directly electrically connected along the second direction to form the sensing electrode lines; or, the driving electrode blocks are electrically connected along the first direction by the at least one via hole and the at least one capacitive bridge to form the driving electrode lines, and the sensing electrode blocks are electrically connected along the second direction by the at least one via hole and the at least one capacitive bridge to form the sensing electrode lines; and the conductive coils crossed and electrically insulated each other are electrically connected by the at least one via hole and the at least one electromagnetic bridge.

Herein, the pattern of the capacitive touch structure (namely driving electrode patterns and sensing electrode patterns) and the pattern of the electromagnetic touch structure (namely the conductive coils) are located on a same layer 12a in the integrated capacitive-electromagnetic composite touch layer 12, so that the accuracy when the electromagnetic touch structure identifies touch signals may be improved.

Preferably, the insulating layer in mode II of the embodiment of the present invention is a transparent organic film.

It should be noted that mode II is similar to mode I, merely the positions of the layers where the pattern of the capacitive touch structure and the pattern of the electromagnetic touch structure are located and the at least one capacitive bridge and the at least one electromagnetic bridge are located are different, and the other similarities are not described redundantly herein.

In the specific implementation, working principles of the capacitive touch structure and the electromagnetic touch structure in mode II are similar to those in mode I, and are not described redundantly herein.

Preferably, referring to FIG. 1, when the integrated capacitive-electromagnetic composite touch layer 12 is located between the BM layer 13 and the color filter layer 14, or as shown in FIG. 2, located between the BM layer 13 and the flattened layer 15, the first conductive layer and the second conductive layer of the integrated capacitive-electromagnetic composite touch layer 12 are preferably made of a metal material; the projection of the BM layer 13 on the transparent substrate 11 covers the projections of the driving electrode lines and the sensing electrode lines crossed and insulated each other on the transparent substrate 11 to prevent light leakage or metal reflection; Preferably, each conductive coil includes at least one hollow region, wherein each hollow region corresponds to a pixel region and the area of each hollow region is not smaller than the corresponding pixel region.

In the implementation, the first conductive layer and the second conductive layer are made of the metal material, so that the resistance of the integrated capacitive-electromagnetic composite touch layer can be reduced.

Figure 7B:
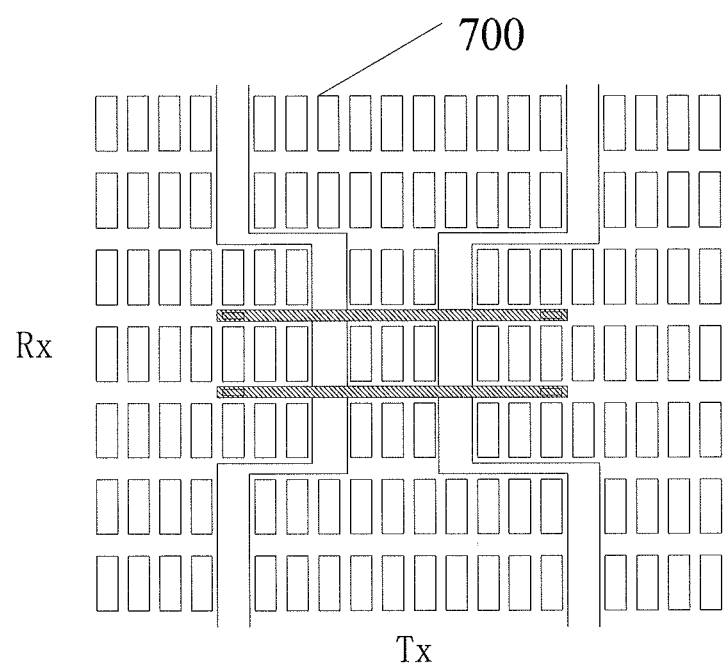
FIG. 7B is a schematic diagram of electrical connection of sensing electrode blocks along a horizontal direction by at least one via hole and at least one capacitive bridge.

Specifically, the pattern of the capacitive touch structure can be designed as shown in FIG. 7B, so that the projection of the BM layer on the transparent substrate covers the projections of the driving electrode lines and the sensing electrode lines crossed and insulated each other on the transparent substrate, therefore, the metal corresponding to pixel opening regions 700 of the driving electrode lines or the sensing electrode lines can be removed according to the shape of the BM layer (the BM is located in an region other than the pixel opening regions), and merely the metal on the part shielded by the BM layer is left to form the pattern of the capacitive touch structure in a similar metal grid shape, wherein, each part of a same electrode line is equipotential, thus ensuring that the part of metal corresponding to the pixel opening regions 700 is removed, preventing the metal from reflecting light and improving light transmittance.

Figure 8B:
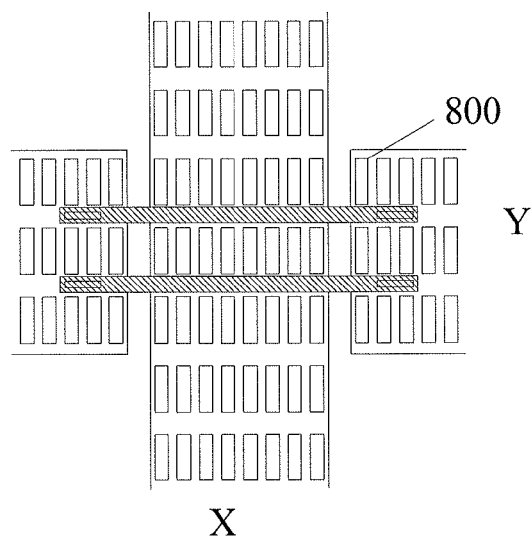
FIG. 8B is a schematic diagram of electrical connection between two conductive coils crossed and electrically insulated each other in an embodiment of the present invention.

The pattern of the electromagnetic touch structure can be designed as shown in FIG. 8B, and each conductive coil (including coils X, namely coils arranged in the X direction, and coils Y, namely coils arranged in the Y direction) includes at least one hollow region 800, wherein each hollow region 800 corresponds to a pixel region and the area of each hollow region 800 is not smaller than that of the corresponding pixel region. Therefore, the line width of a single conductive coil is greater than the total width of a plurality of pixels arranged adjacently within a scale of a single coil, and the metal on each conductive coil is partly removed according to the size of the pixel opening regions to form metal grids, thus ensuring that the metal corresponding to the pixel opening regions is removed, preventing the metal from reflecting light and improving the light transmittance.

Preferably, as shown in FIG. 2, the integrated capacitive-electromagnetic composite touch layer 12 is arranged between the BM layer 13 and the flattened layer 15, its insulating layer is the color filter layer 14, and the capacitive touch structure is electrically insulated from the electromagnetic touch structure through the color filter layer 14.

In the implementation, the color filter layer 14 serves as the insulating layer of the integrated capacitive-electromagnetic composite touch layer 12, so that the liquid crystal panel into which the integrated capacitive-electromagnetic composite touch layer 12 is embedded in the embodiment of the present invention is thinned.

Preferably, the embodiment of the present invention also provides a display device, including the liquid crystal panel of any one of above-mentioned embodiments.

The present invention also provides a scanning method for a display device including a capacitive touch structure and an electromagnetic touch structure, which is particularly applied to the display device including the liquid crystal panel of any one of above-mentioned embodiments. Preferably, the scanning method for a display device provided in an embodiment of the present invention includes: performing display scanning, and capacitive touch scanning or electromagnetic touch scanning in a time sharing manner in one frame; or, simultaneously performing electromagnetic touch scanning and display scanning in one frame; or, simultaneously performing capacitive touch scanning and electromagnetic touch scanning in one frame.

In the specific implementation, the display device drives liquid crystal rotate through an electric field (on a capacitance basis) generated by a TFT to present display, while the main medium for data exchange of the electromagnetic touch structure is a magnetic field, so an electromagnetic touch scanning can be simultaneously conducted with the display scanning.

In the specific implementation, in order to realize that capacitive touch scanning and electromagnetic touch scanning are performed simultaneously in one frame, an IC needs to have relatively high performance, and there are some requirements for a number of input channels and processing channels of the display device (such as a number of cores of a CPU and the like).

Preferably, performing display scanning and, capacitive touch scanning or electromagnetic touch scanning in a time sharing manner includes: performing electromagnetic touch pre-scanning to determine whether there is an electromagnetic needle around the display device; performing display scanning after the electromagnetic touch pre-scanning; if there is an electromagnetic needle around the display device, performing electromagnetic touch scanning after the display scanning; otherwise, performing capacitive touch scanning after the display scanning.

Or, preferably, performing display scanning and, capacitive touch scanning or electromagnetic touch scanning in a time sharing manner includes: performing electromagnetic touch pre-scanning to determine whether there is an electromagnetic needle around the display device; if there is an electromagnetic needle around the display device, performing electromagnetic touch scanning; otherwise, performing capacitive touch scanning; performing display scanning.

In the implementation, by adopting the above-mentioned working method in a time sharing manner, interference of a human touch to the touch input of the electromagnetic needle when a user performs a touch input through the electromagnetic needle may be prevented.

Preferably, the time for the capacitive touch scanning is the same as that for the electromagnetic touch scanning, is about 3 ms to 5 ms, and may be variable according to different detection channels of the display device and different time for display scanning.

Performing display scanning and, capacitive touch scanning or electromagnetic touch scanning in a time sharing manner in the embodiment of the present invention is introduced below with a specific embodiment.

Figure 10:
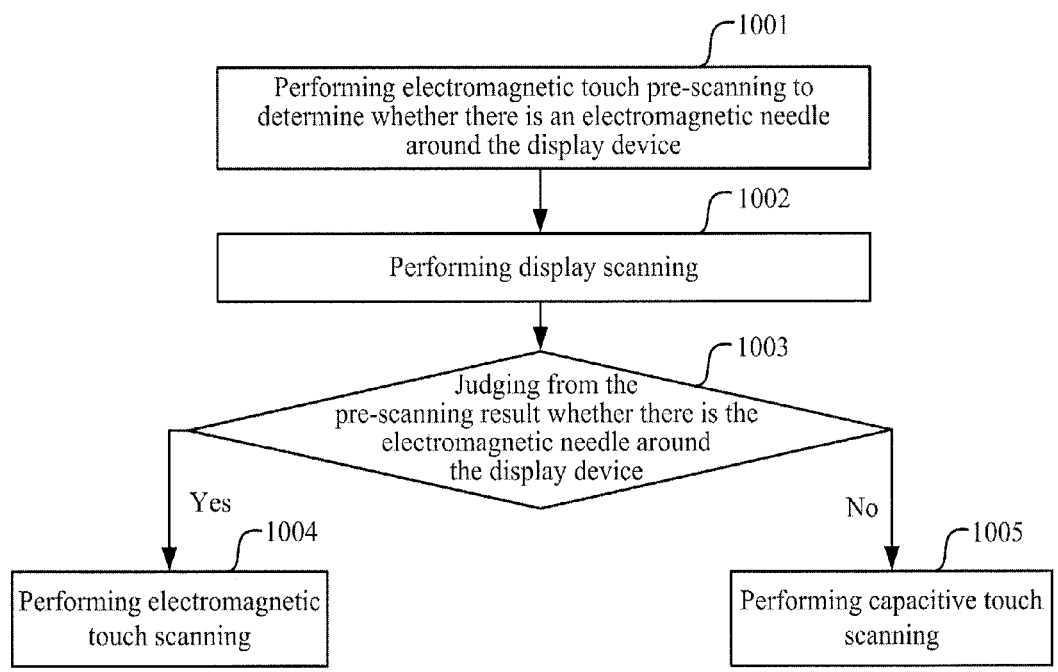
FIG. 10 is a flow schematic diagram of a method for performing display scanning, and capacitive touch scanning or electromagnetic touch scanning in a time sharing manner in an embodiment of the present invention.

As shown in FIG. 10, performing display scanning and, capacitive touch scanning or electromagnetic touch scanning in a time sharing manner includes:

step 1001, performing electromagnetic touch pre-scanning to determine whether there is an electromagnetic needle around the display device;

step 1002, performing display scanning after the electromagnetic touch pre-scanning;

step 1003, judging from the pre-scanning result whether there is the electromagnetic needle around the display device, if so, executing step 1004, otherwise, executing step 1005;

step 1004, performing electromagnetic touch scanning after the display scanning;

in the specific implementation, if one frame is 16.67 ms, the time for the electromagnetic touch scanning is 3 to 5 ms;

step 1005, performing capacitive touch scanning after the display scanning, In the specific implementation, if one frame is 16.67 ms, the time for the capacitive touch scanning is 3 to 5 ms.

Although the preferred embodiments of the present invention have been described, other changes and modifications could be made to these embodiments by those skilled in the art once they get the basic creative concepts. Accordingly, the appended claims are intended to be interpreted as encompassing the preferred embodiments and all the changes and modifications falling within the scope of the present invention.

Obviously, various modifications and variations of the present invention can be made by those skilled in the art without departing from the essence and scope of the present invention. Thus, provided that these modifications and variations of the present invention fall within the scope of the claims of the invention and equivalent technologies thereof, the invention is intended to encompass the modifications and variations.

What is claimed is:

1. A liquid crystal panel, comprising:
   a liquid crystal layer;
   a thin film transistor substrate on one side of the liquid crystal layer; and
   a color filter substrate on the other side of the liquid crystal layer, the color filter substrate comprising:
   a transparent substrate;
   a black matrix layer, a color filter layer and a flattened layer stacked successively on the inner side of the transparent substrate, wherein the black layer is a black light-shielding layer; and
   an integrated capacitive-electromagnetic composite touch layer, configured to identify touch signals, located on the inner side of the transparent substrate, between any two adjacent layers of the black matrix layer, the color filter layer, and the flattened layer, the liquid crystal layer,
   wherein the integrated capacitive-electromagnetic composite touch layer comprises a capacitive structure and an electromagnetic touch structure electrically insulated from each other,
   wherein the integrated capacitive-electromagnetic composite touch layer comprises a first conductive layer, an insulating layer and a second conductive layer;
   wherein the first conductive layer comprises a plurality of driving electrode lines arranged in parallel in a first direction and a plurality of sensing electrode lines arranged in parallel in a second direction for forming the capacitive touch structure, and a plurality of conductive coils crossed, electrically insulated each other and configured to form the electromagnetic touch structure, wherein each driving electrode line comprises a plurality of driving electrode blocks connected successively and electrically, each sensing electrode line comprises a plurality of sensing electrode blocks connected successively and electrically, the driving electrode lines and the sensing electrode lines are crossed and electrically insulated each other, and the driving electrode lines, the sensing electrode lines and the conductive coils are electrically insulated from each other;
   wherein the insulating layer comprises at least one via hole conducting the first conductive layer and the second conductive layer;
   wherein the second conductive layer comprises at least one capacitive bridge and at least one electromagnetic bridge which are electrically insulated from each other;
   wherein, the driving electrode blocks are directly electrically connected along the first direction to form the driving electrode lines, and the sensing electrode blocks are electrically connected along the second direction by the at least one via hole and the at least one capacitive bridge to form the sensing electrode lines; or,
   the driving electrode blocks are electrically connected along the first direction by the at least one via hole and the at least one capacitive bridge to form the driving electrode lines, and the sensing electrode blocks are directly electrically connected along the second direction to form the sensing electrode lines; or,
   the driving electrode blocks are electrically connected along the first direction by the at least one via hole and the at least one capacitive bridge to form the driving electrode lines, and the sensing electrode blocks are electrically connected along the second direction by the at least one via hole and the at least one capacitive bridge to form the sensing electrode lines;
   conductive coils crossed and electrically insulated each other are electrically connected by the at least one via hole and the at least one electromagnetic bridge.

2. The liquid crystal panel according to claim 1, wherein the integrated capacitive-electromagnetic composite touch layer is located between the black matrix layer and the color filter layer, or located between the black matrix layer and the flattened layer, and the first conductive layer and the second conductive layer are made of a metal material;
   wherein a projection of the black matrix layer on the transparent substrate covers projections of the driving electrode lines and the sensing electrode lines crossed mutually and insulated each other electrically on the transparent substrate;
   wherein each conductive coil comprises at least one hollow region, wherein each hollow region corresponds to a pixel region and the area of each hollow region is not smaller than that of the corresponding pixel region.

3. The liquid crystal panel according to claim 1, wherein the integrated capacitive-electromagnetic composite touch layer is arranged between the black matrix layer and the flattened layer;
   wherein the insulating layer is the color filter layer, and the capacitive touch structure is electrically insulated from the electromagnetic touch structure by the color filter layer.

4. A scanning method for displaying, applied to a display device as in claim 1, the scanning method comprises:
   performing display scanning and, capacitive touch scanning or electromagnetic touch scanning in a time sharing manner in one frame,
   wherein the performing display scanning and capacitive touch scanning or electromagnetic touch scanning in a time sharing manner in one frame comprises:
   performing electromagnetic touch pre-scanning to determine whether there is an electromagnetic needle around the display device;
   performing the display scanning after the electromagnetic touch pre-scanning;
   performing the electromagnetic touch scanning after the display scanning if there is an electromagnetic needle around the display device, otherwise, performing the capacitive touch scanning after the display scanning; or,
   wherein the performing display scanning and capacitive touch scanning or electromagnetic touch scanning in a time sharing manner in one frame comprises:
   performing electromagnetic touch pre-scanning to determine whether there is an electromagnetic needle around the display device;
   performing the electromagnetic touch scanning if there is an electromagnetic needle around the display device, otherwise, performing the capacitive touch scanning;
   performing the display scanning.

5. A liquid crystal panel, comprising:
   a liquid crystal layer;
   a thin film transistor substrate on one side of the liquid crystal layer; and
   a color filter substrate on the other side of the liquid crystal layer, the color filter substrate comprising:
   a transparent substrate;

a black matrix layer, a color filter layer and a flattened layer stacked successively on the inner side of the transparent substrate, wherein the black layer is a black light-shielding layer; and an integrated capacitive-electromagnetic composite touch layer, configured to identify touch signals, located on the inner side of the transparent substrate, between any two adjacent layers of the black matrix layer, the color filter layer, and the flattened layer, the liquid crystal layer, wherein the integrated capacitive-electromagnetic composite touch layer comprises a capacitive structure and an electromagnetic touch structure electrically insulated from each other, wherein the integrated capacitive-electromagnetic composite touch layer comprises a capacitive touch structure and an electromagnetic touch structure electrically insulated from each other;

wherein the integrated capacitive-electromagnetic composite touch layer comprises a first conductive layer, an insulating layer and a second conductive layer, wherein the first conductive layer comprises at least one electromagnetic bridge, a plurality of driving electrode lines arranged in parallel in a first direction and a plurality of sensing electrode lines arranged in parallel in a second direction for forming the capacitive touch structure, wherein each driving electrode line comprises a plurality of driving electrode blocks connected successively and electrically, each sensing electrode line comprises a plurality of sensing electrode blocks connected successively and electrically, the driving electrode lines and the sensing electrode lines are crossed and electrically insulated each other, and the driving electrode lines and the sensing electrode lines are electrically insulated from the at least one electromagnetic bridge, wherein the insulating layer comprises at least one via hole conducting the first conductive layer and the second conductive layer, wherein the second conductive layer comprises at least one capacitive bridge and a plurality of conductive coils crossed and electrically insulated each other and configured to form an electromagnetic touch structure, wherein the conductive coils are electrically insulated from the at least one capacitive bridge, wherein, the driving electrode blocks are directly electrically connected along the first direction to form the driving electrode lines, and the sensing electrode blocks are electrically connected along the second direction by the at least one via hole and the at least one capacitive bridge to form the sensing electrode lines; or, the driving electrode blocks are electrically connected along the first direction by the at least one via hole and the at least one capacitive bridge to form the driving electrode lines, and the sensing electrode blocks are directly electrically connected along the second direction to form the sensing electrode lines; or, the driving electrode blocks are electrically connected along the first direction by the at least one via hole and the at least one capacitive bridge to form the driving electrode lines, and the sensing electrode blocks are electrically connected along the second direction by the at least one via hole and the at least one capacitive bridge to form the sensing electrode lines;

and the conductive coils crossed and electrically insulated each other are electrically connected by the at least one via hole and the at least one electromagnetic bridge.

6. The liquid crystal panel according to claim 5, wherein:
the integrated capacitive-electromagnetic composite touch layer is located between the black matrix layer and the color filter layer, or located between the black matrix layer and the flattened layer; and
the first conductive layer and the second conductive layer are made of a metal material;
a projection of the black matrix layer on the transparent substrate covers projections of the driving electrode lines and the sensing electrode lines crossed mutually and insulated each other electrically on the transparent substrate;
each conductive coil comprises at least one hollow region, wherein each hollow region corresponds to a pixel region and the area of each hollow region is not smaller than that of the corresponding pixel region.

7. The liquid crystal panel according to claim 5, wherein the integrated capacitive-electromagnetic composite touch layer is arranged between the black matrix layer and the flattened layer;
the insulating layer is the color filter layer, and the capacitive touch structure is electrically insulated from the electromagnetic touch structure by the color filter layer.

8. The liquid crystal panel according to claim 5, wherein among the first conductive layer, the insulating layer and the second conductive layer, the second conductive layer is the closest to the liquid crystal layer.

9. The liquid crystal panel according to claim 8, wherein the integrated capacitive-electromagnetic composite touch layer is located between the black matrix layer and the color filter layer, or located between the black matrix layer and the flattened layer, and the first conductive layer and the second conductive layer are made of a metal material;
wherein a projection of the black matrix layer on the transparent substrate covers projections of the driving electrode lines and the sensing electrode lines crossed mutually and insulated each other electrically on the transparent substrate; and
wherein each conductive coil comprises at least one hollow region, wherein each hollow region corresponds to a pixel region and the area of each hollow region is not smaller than that of the corresponding pixel region.

10. The liquid crystal panel according to claim 8, wherein the integrated capacitive-electromagnetic composite touch layer is arranged between the black matrix layer and the flattened layer;
the insulating layer is the color filter layer, and the capacitive touch structure is electrically insulated from the electromagnetic touch structure by the color filter layer.

* * * * *